(12) United States Patent
Shen et al.

(10) Patent No.: US 12,518,838 B2
(45) Date of Patent: Jan. 6, 2026

(54) MANAGING POWER SUPPLY IN SEMICONDUCTOR DEVICES

(71) Applicant: Macronix International Co., Ltd., Hsinchu (TW)

(72) Inventors: Shin-Jang Shen, Zhubei (TW); Chun-Lien Su, Taichung (TW); Shih-Chou Juan, Taoyuan (TW)

(73) Assignee: Macronix International Co., Ltd., Hsinchu (TW)

( * ) Notice: Subject to any disclaimer, the term of this patent is extended or adjusted under 35 U.S.C. 154(b) by 188 days.

(21) Appl. No.: 18/467,047

(22) Filed: Sep. 14, 2023

(65) Prior Publication Data

US 2025/0095751 A1   Mar. 20, 2025

(51) Int. Cl.
   *G11C 16/30*   (2006.01)
(52) U.S. Cl.
   CPC .................................. *G11C 16/30* (2013.01)
(58) Field of Classification Search
   CPC ........................................................ G11C 16/30
   See application file for complete search history.

(56) References Cited

U.S. PATENT DOCUMENTS

| 2002/0190781 | A1* | 12/2002 | Daak | G11C 16/30 327/536 |
| 2004/0196093 | A1 | 10/2004 | Le et al. | |
| 2008/0205134 | A1* | 8/2008 | Kato | H02M 3/07 327/148 |
| 2009/0097285 | A1* | 4/2009 | Cook | H02M 3/07 363/60 |
| 2011/0115549 | A1* | 5/2011 | Cook | H02M 3/07 327/536 |
| 2013/0051159 | A1* | 2/2013 | Ryu | G11C 7/00 365/189.011 |
| 2013/0328618 | A1* | 12/2013 | Pan | H02M 3/073 327/536 |
| 2020/0111513 | A1 | 4/2020 | Baek et al. | |
| 2022/0165339 | A1 | 5/2022 | Rana et al. | |
| 2022/0263408 | A1 | 8/2022 | Hong | |
| 2022/0352807 | A1 | 11/2022 | Kim et al. | |
| 2023/0318450 | A1* | 10/2023 | Grande | G11C 16/30 |

FOREIGN PATENT DOCUMENTS

TW   200931439 A   7/2009
TW   201312576 A   3/2013

* cited by examiner

*Primary Examiner* — Jay W. Radke
(74) *Attorney, Agent, or Firm* — Fish & Richardson P.C.

(57) ABSTRACT

Systems, devices, methods, and circuits for managing power supply in semiconductor devices are provided. The semiconductor devices can include 3D NAND flash memory devices with high capacity and/or high performance. In one aspect, a semiconductor device includes: a voltage pump, a pump switch circuit configured to be coupled to the voltage pump, and an interface including a voltage pin coupled to the pump switch circuit. The voltage pump has an input, an output, and a series of pump stages coupled between the input and the output. The pump switch circuit is configured to provide an input voltage received at the voltage pin to a corresponding node in the voltage pump to select a corresponding number of pump stages of the series of pump stages to output a target voltage at the output of the voltage pump.

23 Claims, 5 Drawing Sheets

MANAGING POWER SUPPLY IN SEMICONDUCTOR DEVICES

TECHNICAL FIELD

The present disclosure is directed to semiconductor devices, e.g., power supply in semiconductor devices.

BACKGROUND

Semiconductor devices, e.g., memory devices, are becoming smaller and faster. Power efficiency is a key issue for the semiconductor devices, which can affect performance of the semiconductor devices and/or associated systems.

SUMMARY

The present disclosure describes methods, devices, systems and techniques for managing power supply in semiconductor devices, e.g., non-volatile memory devices such as NAND flash memory devices.

One aspect of the present disclosure features a semiconductor device, including: a voltage pump having an input, an output, and a series of pump stages coupled between the input and the output; a pump switch circuit configured to be coupled to the voltage pump; and an interface including a voltage pin coupled to the pump switch circuit. The pump switch circuit is configured to provide an input voltage received at the voltage pin to a corresponding node in the voltage pump to select a corresponding number of pump stages of the series of pump stages to output a target voltage at the output of the voltage pump.

In some implementations, the corresponding number is an integer identical to or larger than 0.

In some implementations, the semiconductor device further includes: a voltage detector and a control circuit coupled to the voltage detector and the pump switch circuit. The voltage detector is configured to detect a value of the input voltage received at the voltage pin. The control circuit is configured to: receive the value of the input voltage from the voltage detector and control the pump switch circuit to be coupled to the corresponding node in the voltage pump based on the value of the input voltage.

In some implementations, the control circuit is configured to: receive a signal indicating the target voltage, and control the pump switch circuit to be coupled to the corresponding node in the voltage pump based on the signal, together with the value of the input voltage.

In some implementations, the target voltage is a first target voltage, and where the control circuit is configured to: receive a second signal indicating a second target voltage, and control the pump switch circuit to be coupled to a second corresponding node in the voltage pump based on the second signal and a second input voltage received at the voltage pin.

In some implementations, the first target voltage corresponds to a first operation performed in the semiconductor device, and the second target voltage corresponds to a second operation performed in the semiconductor device, the second operation being different from the first operation, the second target voltage being different from the first target voltage.

In some implementations, the pump switch circuit includes a transistor coupled between the voltage pin and the voltage detector.

In some implementations, the pump switch circuit includes a switch switchable to be coupled to each of a plurality of nodes in the voltage pump, and the plurality of nodes includes: a first node between the output of the voltage pump and a first pump stage of the series of pump stages, the first pump stage being adjacent to the output of the voltage pump, and a second node between two adjacent pump stages of the series of pump stages.

In some implementations, the semiconductor device further includes a reference voltage circuit configured to provide a reference voltage. The control circuit is configured to calibrate the target voltage based on the reference voltage.

In some implementations, the interface further includes a second voltage pin coupled to the input of the voltage pump and configured to receive a second voltage. The voltage pump is configured to generate an output voltage at the output of the voltage pump based on the series of pump stages and the second voltage. The second voltage can be a supply voltage VCC or VCCQ.

In some implementations, the voltage pump is configured to generate the target voltage with a first power efficiency and to generate the output voltage with a second power efficiency that is lower than the first power efficiency.

In some implementations, the interface further includes a third voltage pin configured to receive a third voltage. The semiconductor device can further include a second voltage detector coupled to the voltage pin and configured to detect a value of the third voltage received at the third voltage pin. The control circuit can be configured to: receive the value of the third voltage from the second voltage detector, determine whether the value of the third voltage matches a predetermined voltage, and in response to determining that the value of the third voltage fails to match the predetermined voltage, disable receiving the third voltage at the third voltage pin and control the pump switch circuit to be coupled to the corresponding node in the voltage pump based on the value of the input voltage to generate the target voltage.

In some implementations, the semiconductor device further includes: a memory array having an array of memory cells coupled to a plurality of word lines; a decoder coupled to the memory array and configured to select each of the plurality of word lines; and a switch circuit coupled between the decoder and the voltage pump and configured to: generate a set of operation voltages based on the target voltage and output the set of operation voltages to the decoder. The decoder is configured to apply the set of operation voltages respectively to corresponding word lines of the plurality of word lines.

In some implementations, the input voltage is in a range of 6 V to 10 V.

Another aspect of the present disclosure features a system, including: a memory device including a memory array having an array of memory cells coupled to a plurality of word lines; and a controller coupled to the memory device and configured to send a command to the memory device, the command indicating the memory device to perform an operation. The memory device further includes: a voltage generator including a voltage pump having an input, an output, and a series of pump stages coupled between the input and the output; a pump switch circuit configured to be coupled to the voltage pump; and an interface including a voltage pin coupled to the pump switch circuit and configured to receive an input voltage. The pump switch circuit is configured to provide the input voltage received at the voltage pin to a corresponding node in the voltage pump to select a corresponding number of pump stages of the series of pump stages to output a target voltage at the output of the voltage pump. The memory device is configured to perform the operation based on the target voltage outputted at the output of the voltage pump.

In some implementations, the system includes a voltage converter coupled to the memory device. The voltage converter is configured to generate the input voltage based on a reference voltage and provide the input voltage to the voltage pin.

In some implementations, the voltage converter is coupled to the controller and configured to generate the input voltage based on a signal from the controller, the signal being associated with the command and indicating the input voltage.

In some implementations, the voltage converter is configured to provide a voltage to the controller.

In some implementations, the memory device further includes: a voltage detector and a control circuit coupled to the voltage detector and the pump switch circuit. The voltage detector is configured to detect a value of the input voltage received at the voltage pin. The control circuit is configured to: receive a signal from the controller, the signal being associated with the operation and indicating the target voltage, receive the value of the input voltage from the voltage detector, and control the pump switch circuit to be coupled to the corresponding node in the voltage pump based on the value of the input voltage and the signal.

In some implementations, the target voltage is a first target voltage, and where the control circuit is configured to: receive a second signal from the controller, the second signal being associated with a second operation and indicating a second target voltage, and control the pump switch circuit to be coupled to a second corresponding node in the voltage pump based on the second signal and a second input voltage received at the voltage pin.

In some implementations, the first target voltage corresponds to a first operation performed in the memory device, and the second target voltage corresponds to a second operation performed in the memory device, the second operation being different from the first operation, the second target voltage being different from the first target voltage.

In some implementations, the controller is configured to send a control signal to a voltage converter to generate the second input voltage to be provided to the voltage pin.

In some implementations, the pump switch circuit includes a switch switchable to be coupled to each of a plurality of nodes in the voltage pump. The plurality of nodes includes: a first node between the output of the voltage pump and a first pump stage of the series of pump stages, the first pump stage being adjacent to the output of the voltage pump, and a second node between two adjacent voltage pumps of the series of pump stages.

In some implementations, the voltage generator further includes a reference voltage circuit configured to provide a reference voltage. The control circuit is coupled to the voltage generator and configured to calibrate the target voltage based on the reference voltage.

In some implementations, the interface further includes a second voltage pin coupled to the input of the voltage pump and configured to receive a second voltage. The voltage pump is configured to generate an output voltage at the output of the voltage pump based on the series of pump stages and the second voltage.

In some implementations, the interface further includes a third voltage pin configured to receive a third voltage. The memory device further includes a second voltage detector coupled to the voltage pin and configured to detect a value of the third voltage received at the third voltage pin. The control circuit is configured to: receive the value of the third voltage from the second voltage detector, determine whether the value of the third voltage matches a predetermined voltage associated with the target voltage, and in response to determining that the value of the third voltage fails to match the predetermined voltage, disable receiving the third voltage at the third voltage pin and control the pump switch circuit to be coupled to the corresponding node in the voltage pump based on the value of the input voltage to generate the target voltage.

In some implementations, the interface includes a plurality of additional voltage pins including the voltage pin, and the memory device includes a plurality of voltage pumps, and where each of the plurality of additional voltage pins is coupled to a corresponding voltage pump of the plurality of voltage pumps.

In some implementations, the system further includes: a row decoder coupled to the memory array and configured to select each of the plurality of word lines and a switch circuit coupled between the row decoder and the voltage generator, where the switch circuit is configured to: generate a set of operation voltages based on the target voltage, and output the set of operation voltages to the row decoder. The row decoder is configured to apply the set of operation voltages respectively to corresponding word lines of the plurality of word lines, and the memory device is configured to perform the operation based on the set of operation voltages to the corresponding word lines.

Another aspect of the present disclosure features a method performed by a semiconductor device, the method including: receiving a command to perform an operation in the semiconductor device; receiving a signal indicating a target voltage associated with the operation; detecting a value of an input voltage at a voltage pin of the semiconductor device, where the semiconductor device includes a pump switch circuit coupled to the voltage pin; controlling the pump switch circuit to be coupled to a corresponding node in a voltage pump of the semiconductor device based on the value of the input voltage and the signal indicating the target voltage, where the voltage pump includes an input, an output, and a series of pump stages coupled between the input and the output; generating the target voltage at the output of the voltage pump using a corresponding number of pump stages coupled between the corresponding node and the output; and performing the operation based on the target voltage.

In some implementations, the method further includes: receiving a second input voltage from a second voltage pin; determining whether the second input voltage matches a predetermined voltage that is associated with the target voltage; and in response to determining that the second input voltage fails to match the predetermined voltage, disabling receiving the second input voltage to the semiconductor device. Controlling the pump switch circuit to be coupled to the corresponding node in the voltage pump can be in response to determining that the second input voltage fails to match the predetermined voltage.

Implementations of the above techniques include methods, systems, circuits, computer program products and computer-readable media. In one example, a method can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

Implementations of the present disclosure provide techniques for managing power supply in semiconductor devices, e.g., non-volatile memory devices such as NAND flash memory devices. The techniques enable to provide high efficient power supply for a semiconductor device (e.g., a memory device) to improve a performance of a system (e.g., a solid-state drive (SSD) system) including the semiconductor device.

In some implementations, the semiconductor device includes a voltage pump configured to pump a fixed (or stable) voltage (e.g., a supply voltage such as VDD or VCC/VCCQ) received at an input and to generate an output voltage at an output based on the fixed voltage. The voltage pump includes a series of pump stages coupled between the input and the output. The pump efficiency using the series of pump stages can be low, e.g., 20% to 30%, and over a half of power in the system can be used for the voltage pump (e.g., to provide voltages to word lines by a switch or regulator to a memory array). The techniques can reduce or minimize pump power consumption of the semiconductor device, e.g., by reducing the number of pump stages used in the voltage pump to improve the pump efficiency. For example, the techniques can use an additional voltage pin to provide a different power level (e.g., an additional voltage higher than the supply voltage) to the voltage pump to generate a target voltage using zero or a small number of pump stages (e.g., 1, 2, . . . ) in the voltage pump.

The techniques also enable to provide different power levels for different operations (e.g., read, program, and/or erase), which can further reduce the power consumption and improve the performance of the semiconductor device and the system. With high efficient power consumption, the techniques enable to increase a number of memory chips for operation at the same time and improve the performance of the system.

In some implementations, a voltage converter (e.g., a DC-DC converter) is configured to generate one or more desired voltages (e.g., 1.2 V, 3 V, 6 V, or 8 V) based on a fixed voltage (e.g., 12 V). The voltage converter can be off-die, e.g., separated from the semiconductor device and/or a controller coupled to the semiconductor device. The voltage converter can have a conversion efficiency higher than the pump efficiency using the series of pump stages. In some examples, the conversion efficiency of the voltage converter is up to 90% or more. The voltage converter can generate a desired voltage (e.g., based on a command from the controller) and provide the desired voltage to an additional voltage pin coupled to the voltage pump. With the desired voltage, the semiconductor device can reduce or minimize the use of pump stages in the voltage pump, e.g., directly providing the desired voltage at the output of the voltage pump or using a small number of pump stages, e.g., 1, 2, or any suitable number, to provide a target voltage.

In some implementations, the semiconductor device includes one or more voltage pins, including a voltage pin for VDD or VCC/VCCQ voltage input (e.g., a fixed or stable voltage such as 1.3 V or 3 V) and a voltage pin for VPP voltage input (e.g., varying within a range between 10.5 V and 13.5 V). The additional voltage pin for the desired voltage can be different from the voltage pins for VDD or VCC/VCCQ and VPP. The additional voltage pin can be coupled to the voltage pump through a power switch circuit that can be configured to be coupled to a corresponding node to select a corresponding number of pump stages based on the desired voltage at the additional voltage pin and the target voltage. In some implementations, the semiconductor device includes a voltage detector configured to detect a voltage level at the voltage pin for VPP voltage input. If the voltage level fails to match the target voltage, the semiconductor device can disable the power input at the voltage pin for VPP voltage input and configure the power switch circuit to receive power from the additional voltage pin and select the corresponding number of pump stages in the voltage pump to provide the target voltage. The term "match" can represent "identical to" or a difference within a threshold (e.g., 1%, 5%, or 10%, or a suitable percentage).

In some implementations, the semiconductor device includes two or more additional voltage pins that can be respectively coupled to two or more voltage pumps (e.g., through corresponding power switch circuits), which can provide more different voltages for different operations in the semiconductor devices, thereby improving the power efficiency of the semiconductor device and performance of the semiconductor device.

The techniques can be implemented with various interfaces or protocols, e.g., Serial Peripheral Interfaces ("SPIs") such as single-bit SPI or multi-bit SPI, or Quad Peripheral Interface ("QPI"). The techniques can be applied to various types of semiconductor devices, e.g., non-volatile memory devices such as NAND flash memory devices, NOR flash memory devices, resistive random-access memory (RRAM) devices, phase-change random-access memory (PCRAM) devices, among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others. For illustration purposes, in the present disclosure, a memory device is described as an example of a semiconductor device. A power supply represents power supplied to a semiconductor device or a component in the semiconductor device. Voltage is described as an example of power.

Figure 1:
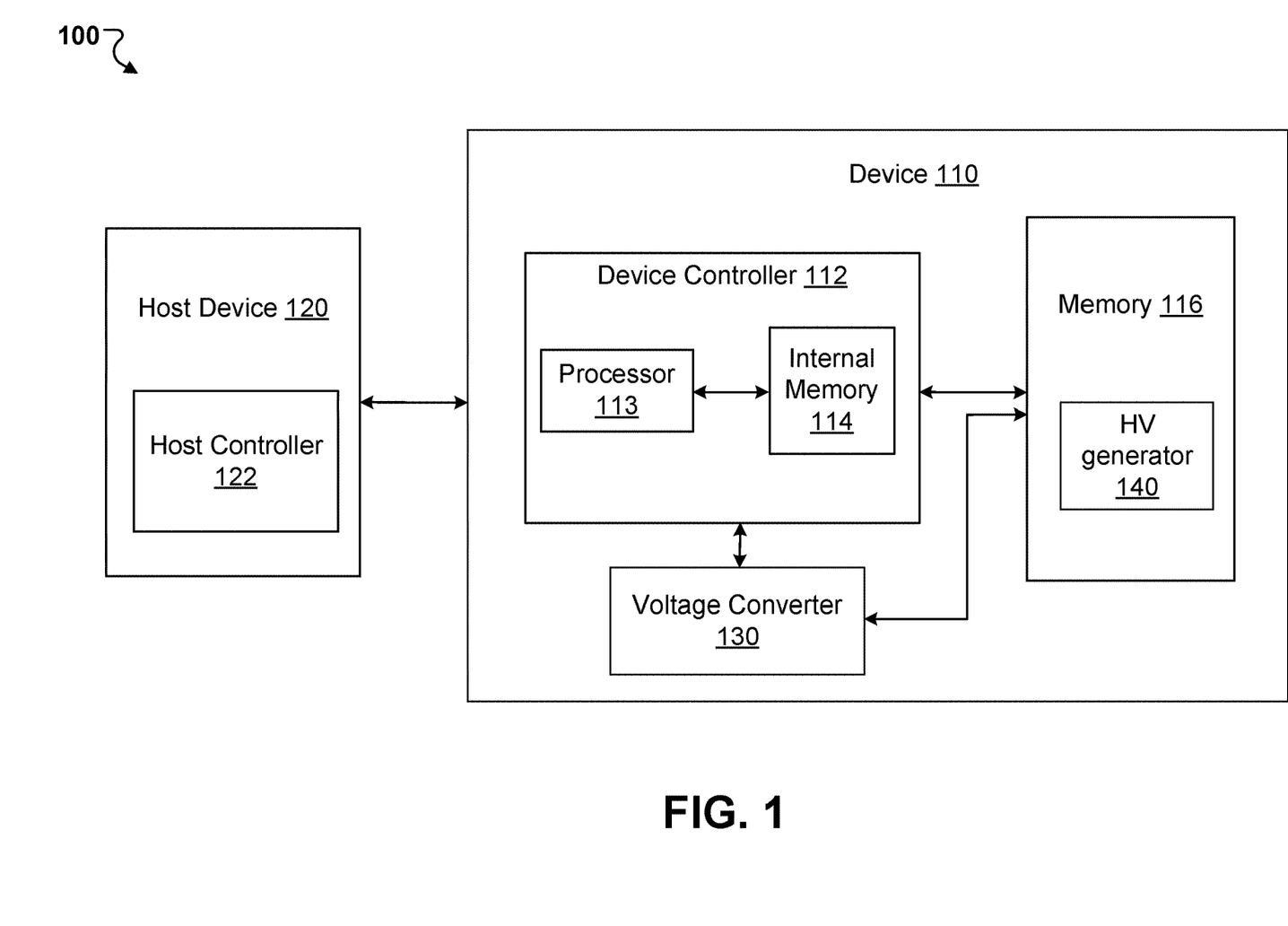
FIG. 1 is a schematic diagram illustrating an example system.

FIG. 1 is a schematic diagram illustrating an example system 100. The system 100 includes a device 110 and a host device 120. The device 110 includes a device controller 112 and a memory 116. The device controller 112 includes a processor 113 and an internal memory 114. In some implementations, the device 110 includes a plurality of memories 116 that are coupled to the device controller 112. The memory 116 includes a plurality of blocks. The memory 116 can be a two-dimensional (2D) memory including 2D memory blocks. The memory 116 can also be a three-dimensional (3D) memory including 3D memory blocks. The memory 116 can be a semiconductor device and formed on a semiconductor substrate (e.g., a silicon wafer).

The host device 120 includes a host controller 122 that can include at least one processor and at least one memory coupled to the at least one processor and storing programming instructions for execution by the at least one processor to perform one or more corresponding operations.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller.

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1. The internal memory 114 stores instruction codes, which correspond to the instructions executed by the processor 113, and/or the data that are requested by the processor 113 during runtime. The device controller 112 transfers the instruction code and/or the data from the memory 116 to the internal memory 114.

In some implementations, the memory 116 is a non-volatile memory that is configured for long-term storage of instructions and/or data, e.g., an NAND or NOR flash memory device, or some other suitable non-volatile memory device. The memory 116 can include one or more memory chips. In implementations where the memory 116 is an NAND flash memory, the device 110 is a flash memory device, e.g., a flash memory card, and the device controller 112 is an NAND flash controller. For example, in some implementations, when the device 110 is an eMMC or an SD card, the memory 116 is an NAND flash memory; in some implementations, when the device 110 is a digital camera, the memory 116 is an SD card; and in some implementations, when the device 110 is a media player, the memory 116 is a hard disk. In some implementations where the memory 116 is an NOR flash memory, the device 110 can optionally include the device controller 112. In some cases, the device 110 can include no device controller and the memory 116 can directly communicate with the host device 120.

In some implementations, a system includes a controller and a semiconductor device. The controller can be coupled to the semiconductor device via an electrical connection, e.g., an electrical wire, pin or bus, or a wireless connection, and communicates, e.g., directly, with the semiconductor device. The controller can be the host controller 122 of FIG. 1 or the device controller 112 of FIG. 1. The semiconductor device can be implemented as the memory 116 of FIG. 1. The semiconductor device can be also a memory device 200 as described with further details in FIG. 2.

In some implementations, the device 110 is supplied with a fixed total power, e.g., 25 V. Implementations in the present disclosure provide techniques to efficiently manage power consumption in the device 110, which can be critical to a performance of the device 110. In some implementations, the device 110 includes a voltage converter 130 configured to convert a fixed (or stable) voltage (e.g., 12 V) to generate different voltages for different purposes/uses, e.g., based on commands from the device controller 112. The voltage converter 130 can have a high conversion efficiency, e.g., up to 90% or more. The voltage converter 130 can be integrated on a board for the device 110. The voltage converter 130 can be separated from the memory 116 that can include one or more dies or memory chips. That is, the voltage converter 130 can be off-die. In some implementations, the voltage converter 130 is arranged to be external from the device controller 112, e.g., as illustrated in FIG. 1. In some implementations, the voltage converter 130 is integrated in the device controller 112.

In some examples, the voltage converter 130 generates an operation voltage (e.g., 1.2 V) to be provided to the device controller 112. In some examples, the voltage converter 130 generates VDD (e.g., 3 V or 1.3 V), VCC/VCCQ (e.g., 3 V or 1.3 V), VPP (e.g., 10.5 V to 13.5 V), and/or one or more additional voltage levels (e.g., 6 V or 8 V) to be provided to the memory 116, e.g., through voltage pins as described with further details below. VPP can represent programming or erasing voltage. VCC/VCCQ can represent a higher voltage with respect to ground (GND). VDD can represents a fixed (or stable) voltage supply and can be used interchangeably with VCC. The memory 116 can include a high voltage (HV) generator 140 that can receive one or more voltages from the voltage converter 130 and generate one or more corresponding voltages to be provided to the memory 116 for performing one or more corresponding operations.

Figure 2:
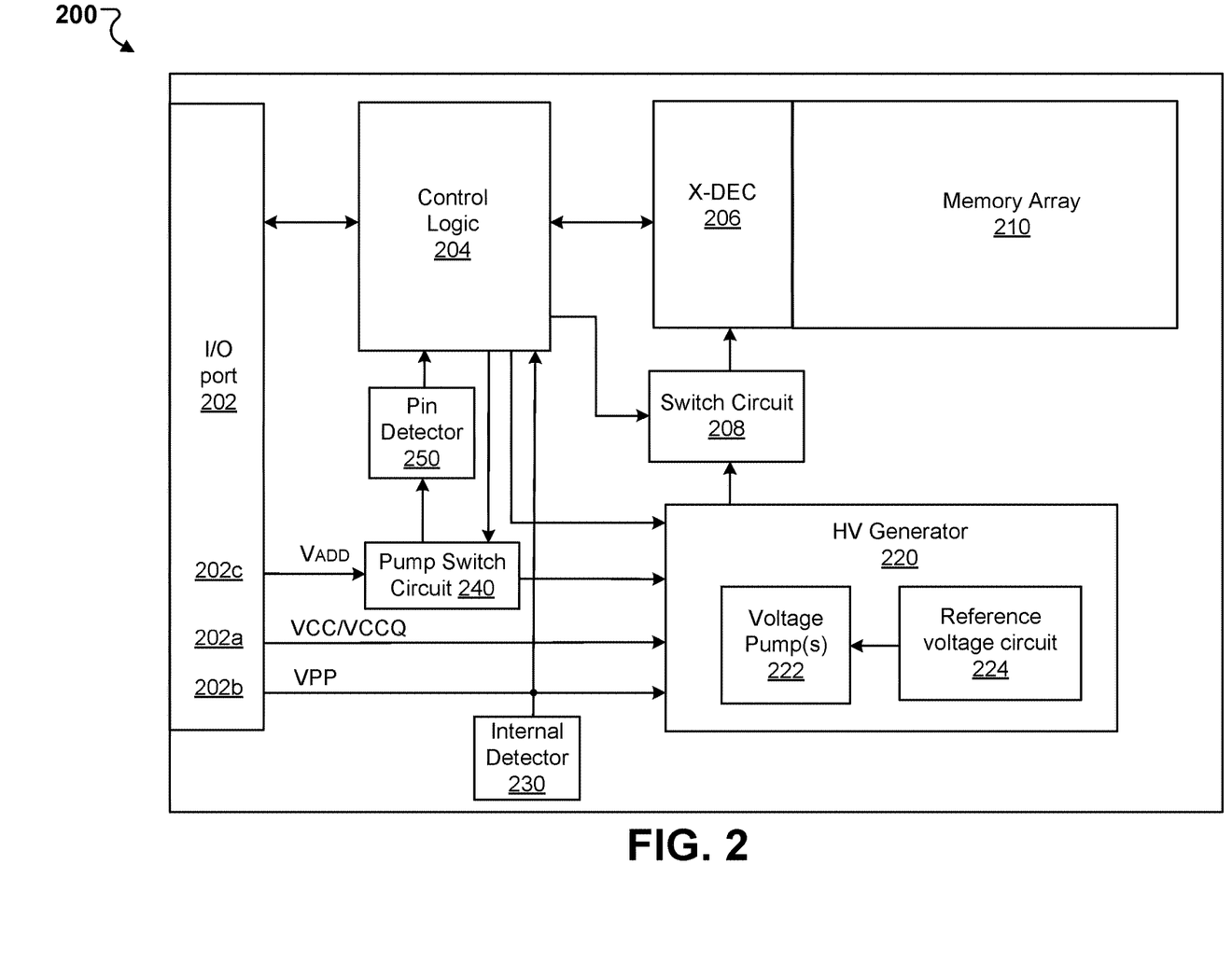
FIG. 2 is a schematic diagram illustrating an example memory device.

FIG. 2 is a schematic diagram illustrating an example memory device 200. The memory device 200 can be implemented as the memory 116 of FIG. 1. As illustrated in FIG. 2, the memory device 200 includes a number of components that can be integrated onto a board, e.g., a Si-based carrier board, and be packaged. The memory device 200 can be configured to efficiently manage power for performing operations in the memory device 200. In some implementations, as illustrated in FIG. 2, the memory device 200 includes a memory interface (I/O port) 202, a control logic 204, an X-decoder 206, a switch circuit 208, a memory array 210, and a high voltage (HV) generator 220.

In some implementations, the memory array 210 includes a number of memory cells. The memory cells can be coupled in series to a number of row word lines and a number of column bit lines. Each memory cell can include a memory transistor configured as a storage element (e.g., a capacitor) to store data. The memory transistor can include a silicon-oxide-nitride-oxide-silicon (SONOS) transistor, a floating gate transistor, a nitride read only memory (NROM) transistor, or any suitable non-volatile memory MOS device that can store charges.

The memory device 200 can include the X-decoder (or row decoder) 206 and optionally a Y-decoder (or column decoder). Each memory cell can be coupled to the X-decoder 206 via a respective word line and coupled to the Y-decoder 212 via a respective bit line. Accordingly, each memory cell can be selected by the X-decoder 206 and the Y-decoder for read or write operations through the respective word line and the respective bit line.

The memory interface 202 can include multiple pins configured to be coupled to one or more external devices, e.g., the device controller 112 and/or the host device 120 and/or the voltage converter 130 of FIG. 1. The pins can include SI/SIO0 for serial data input/serial data input & output, SO/SIO1 for serial data output/serial data input & output, SIO2 for serial data input or output, SIO3 for serial data input or output, RESET # for hardware reset pin active low, CS # for chip select, and ECS # for ECC correction signal, and R/B # pin for indicating a ready or busy status of the memory device 200. ECS is abbreviation of Error Correction Code (ECC) Correction Signal. The memory interface 202 can also include one or more other pins, e.g., WP # for write protection active low, and/or Hold # for a holding signal input. As discussed with further details below, the memory interface 202 can also include one or more voltage pins, e.g., pin 202a for receiving a supply voltage VCC/VCCQ, and pin 202b for receiving an operation voltage VPP.

The HV generator 220 can be configured to receive input voltages from the voltage pins in the memory interface 202 and generate corresponding target voltages for different operations (e.g., read, write/program, and/or erase). For example, a read voltage (e.g., 6 V) can be smaller than a write voltage (e.g., 8 V). In some implementations, e.g., as illustrated in FIG. 2, the HV generator 220 includes one or more voltage pumps (222) configured to pump stages from the memory interface 202 to the target voltages. As described with further details in FIG. 3, a voltage pump 222 includes a series of pump stages. In some implementations, e.g., as illustrated in FIG. 2, the HV generator 220 includes a reference voltage circuit 224 configured to provide a reference voltage that can be used to calibrate voltages output by the voltage pump(s) 222.

In some implementations, the HV generator 220 outputs a voltage (e.g., a read voltage or a write voltage) to the X decoder 206 through the switch circuit 208. In some implementations, the switch circuit 208 is externally coupled between the HV generator 220 and the X decoder 206, e.g., as illustrated in FIG. 2. In some implementations, the switch circuit 208 is included in the HV generator 220. The switch circuit 208 can include a switch and/or a regulator, and can be configured to regulate the voltage from the HV generator 220 into a set of voltages for a group of word lines (e.g., in a same block). The X-decoder 206 can select the group of word lines and apply the set of voltages respectively to the group of word lines. In some implementations, the memory device 200 includes an internal detector 230 that can be coupled to the pin 202b and the control logic 204. The internal detector 230 can be configured to detect a voltage level of a programming/erasing voltage VPP provided at the pin 202b and provide a result of the detection to the control logic 204.

The control logic 204 can be coupled to components in the memory device 200 including the memory interface 202, the X-decoder 206, the switch circuit 208, the HV generator 220, and/or the internal detector 230. The control logic 204 can be configured to receive a command, address information, and/or data, e.g., from a controller such as the device controller 112 of FIG. 1, via the memory interface 202. The control logic 204 can also process the command, the address information, and/or the data, for example, to generate physical address information, e.g., of blocks/pages, in the memory array 210.

In some implementations, the control logic 204 includes a data register, an SRAM buffer, an address generator, a mode logic, and a state machine. The mode logic can be configured to determine whether there is a read or write operation and provide a result of the determination to the state machine.

During a write operation, the data register in the control logic 204 can register input data from the memory interface 202, and the address generator in the control logic 204 can generate corresponding physical addresses to store the input data in specified memory cells of the memory array 210. The address generator can be connected the X-decoder 206 and a page buffer that are controlled to select the specified memory cells through corresponding word lines and bit lines. The SRAM buffer can retain the input data from the data register in its memory as long as power is being supplied. The state machine can process a write signal from the SRAM buffer and provide a control signal to the HV generator 220 that can provide a write voltage to the X-decoder 206 (through the switch circuit 208) and the page buffer. The page buffer is configured to output the write voltage to the bit lines (BLs) for storing the input data in the specified memory cells.

During a read operation, the state machine can provide control signals to the HV generator 220 and a page buffer circuit. The voltage generator can provide a read voltage to the X-decoder 206 and the page buffer for selecting a memory cell. A page buffer can sense a small power signal (e.g., a current signal) that represents a data bit ("1" or "0") stored in the selected memory cell through a bit line coupled to the page buffer and the selected memory cell. A sense amplifier can amplify the small power signal swing to recognizable logic levels so the data bit can be interpreted properly by logic inside or outside the memory device 200. A data buffer can receive the amplified voltage from the sensor amplifier and output the amplified power signal to the logic outside the memory device 200 through the memory interface 202.

As discussed above and below with further details, implementations of the present disclosure provide techniques for efficiently managing power supply for performing operations in the memory array 210. In some implementations, e.g., as illustrated in FIG. 2, the memory interface 202 includes an additional (or extra) pin 202c configured to receive an additional (or extra) voltage $V_{ADD}$ that can have a voltage level different from the voltages (VCC/VCCQ and VPP) received at pins 202a, 202b. The additional pin 202c can be coupled to the HV generator 220, e.g., a voltage pump 222. The pin 202b for receiving the voltage VPP can be also coupled to a voltage pump 222 in the HV generator 220. The voltage pump 222 can output a voltage associated with the voltage VPP to the X decoder 206 through the switch circuit 208.

In some implementations, the memory device 200 includes a pump switch circuit 240 and a pin detector 250. The additional pin 202c can be coupled to the pump switch circuit 240 that is coupled to the pin detector 250 and the HV generator 220 (e.g., the voltage pump 222). The additional pin 202c can be also directly coupled to the pin detector 250. The pin detector 250 can be coupled to the control logic 204 that can be coupled to the pump switch circuit 240.

As described with further details below, the pin detector 250 can be configured to detect a value (or a voltage level) of an input voltage $V_{ADD}$ received at the additional pin 202c. The value of the input voltage $V_{ADD}$ can be provided to the control logic 204 (e.g., by the pin detector 250). The control logic 204 can receive a command from a controller (e.g., the device controller 112 of FIG. 1) through the memory interface 202. The command can include a command for an operation, e.g., read, write, or erase. The controller can indicate a target voltage for the operation in the command. The controller can also provide a signal to the control logic 204, and the signal indicates the target voltage for the operation. The control logic 204 can be configured to generate a control signal to the pump switch circuit 240 based on the value of the input voltage $V_{ADD}$ and the target voltage indicated in the command and/or the signal. The control signal can control the pump switch circuit 240 to be coupled to a corresponding node in the voltage pump 222 to select a corresponding number of pump stages (e.g., 0, 1, 2, ... ) in the voltage pump 222. As noted above, the controller can also control a voltage converter (e.g., the voltage converter 130) to generate a desired voltage to be provided to pin 202c as the input voltage $V_{ADD}$. The desired voltage can be configured to be close to or identical to the target voltage, which can minimize or eliminate the use of pump stages in the voltage pump 222 to thereby improve power consumption efficiency of the memory device 200.

Figure 3:
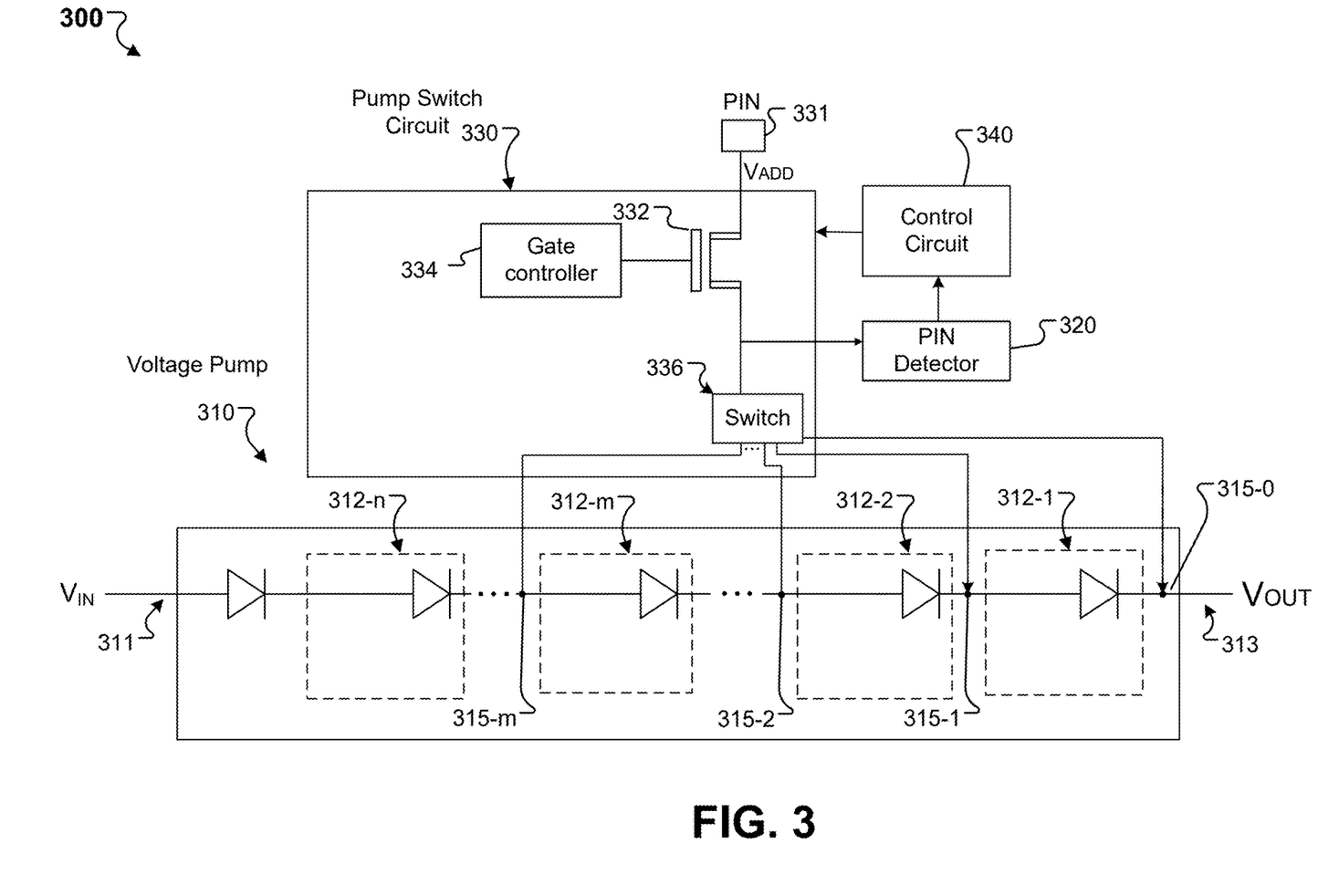
FIG. 3 is a schematic diagram illustrating an example circuitry including an example voltage pump and an example pump switch circuit.

FIG. 3 is a schematic diagram illustrating an example circuitry 300 including an example voltage pump 310 and an example pump switch circuit 330. The circuitry 300 can be implemented in the memory device 200. The voltage pump 310 can be same as, or similar to, the voltage pump 222 of FIG. 2. The pump switch circuit 330 can be same as, or similar to, the pump switch circuit 240 of FIG. 2.

In some implementations, the voltage pump 310 includes an input 311, an output 313, and a series of pump stages 312-1, 312-2, ... , 312-m, ... , 312-n (referred to generally as pump stages 312 and individually as pump stage 312) between the input 311 and the output 313. m and n are integer, and m is smaller than or identical to n. Each pump stage 312 can include a diode coupled between an input and an output of the pump stage 312. In some implementations, the pump stage 312 further includes a capacitor coupled to a node between the input of the pump stage 312 and an input of the diode. The input 311 of the voltage pump 310 can be coupled to a voltage pin (e.g., pin 202a of FIG. 2) and receive an input voltage $V_{IN}$ (that can be fixed (or stable) voltage VDD or VCC/VCCQ). The voltage pump 310 can generate an output voltage $V_{OUT}$ at the output 313. In some implementations, the input voltage $V_{IN}$ received at the input 311 can be pumped through the series of pump stages 312 to generate the output voltage $V_{OUT}$.

The circuitry 300 can further include a pin detector 320 and a control circuit 340. As illustrated in FIG. 3, the pump switch circuit 330 can be coupled to an additional voltage pin 331 (e.g., pin 202c of FIG. 2). The pin 331 can receive an additional voltage $V_{ADD}$ (e.g., $V_{ADD}$ of FIG. 2) to the pump switch circuit 330. The pin detector 320 (e.g., the pin detector 250 of FIG. 2) can be coupled to the pump switch circuit 330 and configured to detect a value (or voltage level) of the additional voltage $V_{ADD}$ at pin 331. The pin detector 320 can provide the detected value of the additional voltage $V_{ADD}$ to the control circuit 340. The control circuit 340 can be same as, or similar to, the control logic 204 of FIG. 2. For example, the control circuit 340 can be part of the control logic 204 of FIG. 2. The control circuit 340 can be coupled to the pump switch circuit 330 and configured to send a control signal to the pump switch circuit 330 to control a connection between the pump switch circuit 330 and the voltage pump to generate a target voltage based on the additional voltage $V_{ADD}$.

In some implementations, e.g., as illustrated in FIG. 3, the pump switch circuit 330 includes a transistor 332, a gate controller 334, and a switch 336. The transistor 332 has a gate terminal coupled to the gate controller 334 that is configured to provide a gate voltage to turn on or off the transistor 332. The gate controller 334 can include an operational amplifier (OPA). The transistor 332 has a first terminal (e.g., source or drain) coupled to the additional voltage pin 331 and a second terminal (e.g., drain or source) coupled to the switch 336. During operation, the gate controller 334 can turn on the transistor 332. If an additional voltage $V_{ADD}$ received at the pin 331 is greater (or higher) than a threshold voltage of the transistor 332, the pin detector 320 detects the additional voltage $V_{ADD}$ at the second terminal of the transistor 332 and provides a value (or voltage level) of the additional voltage $V_{ADD}$ to the control circuit 340.

As noted above, the control circuit 340 can receive a command from a controller (e.g., the device controller 112 of FIG. 1). The command can include a command for an operation, e.g., read, write, or erase. The controller can indicate a target voltage (e.g., 6 V for read operation or 8 V for write operation) for the operation in the command. The control circuit 340 can also receive a signal from the controller, and the signal indicates the target voltage for the operation. The control circuit 340 can be configured to generate a control signal to the pump switch circuit 330 based on the value of the additional voltage $V_{ADD}$ and the target voltage indicated in the command or the signal. The control signal can control the switch 336 in the pump switch circuit 330 to be coupled to a corresponding node 315-0, 315-1, 315-2, ... , 315-m (referred to generally as nodes 315 and individually as node 315) in the voltage pump 310 to select a corresponding number of pump stages (e.g., 0, 1, 2, ... , m) in the voltage pump 310. As noted above, the controller can also control a voltage converter (e.g., the voltage converter 130 of FIG. 1) to generate a desired voltage to be provided to pin 331 as the additional voltage $V_{ADD}$. The desired voltage can be configured to be close to the target voltage, which can minimize or eliminate the use of pump stages in the voltage pump 310. If the control circuit 340 determines to use the additional voltage $V_{ADD}$ to provide the target voltage, the control circuit 340 can disable the input 311 of the voltage pump 310 or disable the voltage pin (e.g., 202a of FIG. 2) coupled to the input 311 to receive the input voltage $V_{IN}$.

In some examples, if the target voltage is 6 V for a read operation, the controller can control the voltage converter to generate a voltage 6 V to be provided to pin 331. Then, the control circuit 340 can generate a control signal to control the switch 336 to be coupled to the node 315-0 at or adjacent to the output 313 to provide the target voltage, bypassing the series of pump stages 312 in the voltage pump 310. If the target voltage is 8 V for a write operation and if the additional voltage $V_{ADD}$ received at pin 331 is 6 V, the control circuit 340 determines that the additional voltage $V_{ADD}$ needs to be pumped by one pump stage (e.g., the pump stage 312-1), and the control circuit 340 can control the switch 336 to be coupled to the node 315-1 to select the pump stage 312-1 to generate the target voltage based on the additional voltage $V_{ADD}$.

Figure 4:
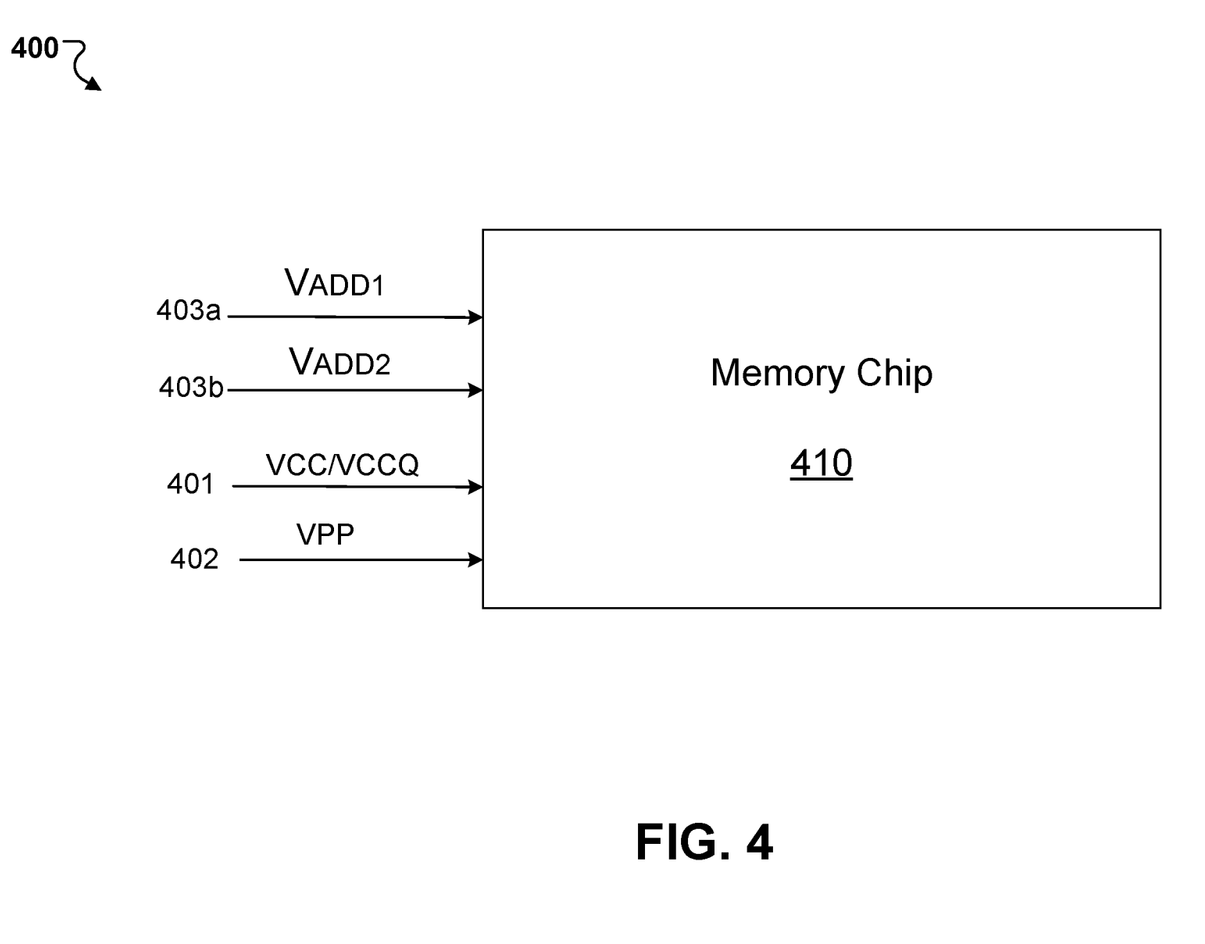
FIG. 4 is a schematic diagram illustrating another example memory device.

As described above, by using the additional voltage pin 331 receiving an additional voltage $V_{ADD}$ different from $V_{IN}$ received at the input 311 of the voltage pump 310, the circuitry 300 can generate a target voltage by using zero or a small number of pump stages in the voltage pump 310, which can improve power efficiency. In some implementations, a memory device (e.g., the memory device 200 of FIG. 2) includes two or more additional voltage pins (e.g., pin 202c of FIG. 2 or 331 of FIG. 3) and two or more voltage pumps (e.g., the voltage pump 222 of FIG. 2 or the voltage pump 310 of FIG. 3) to provide different levels of voltages for different uses/operations. FIG. 4 is a schematic diagram illustrating another example memory device 400. The example memory device 400 includes a memory chip 410 (e.g., the memory 116 of FIG. 1 or the memory device 200 of FIG. 2). The memory chip 410 can be a NAND flash memory chip. The memory device 400 can include one or more memory chips. The memory chip 410 can have multiple voltage pins, e.g., pin 401 for receiving voltage VCC/VCCQ, pin 402 for receiving voltage VPP, and two more additional voltage pins 403a, 403b for receiving additional voltages $V_{ADD1}$, $V_{ADD2}$.

Each additional voltage pin can be coupled to a corresponding voltage pump, e.g., through a pump switch circuit (e.g., the pump switch circuit 240 of FIG. 2 or 330 of FIG. 3). One or more pin detectors (e.g., the pin detector 250 of FIG. 2 or the pin detector 320 of FIG. 3) can be configured to detect voltages received at the additional voltage pins. A pin detector can be configured to detect one or more voltages at one or more additional voltage pins. A control circuit (e.g., the control logic 204 of FIG. 2 or the control circuit 340 of FIG. 3) can be coupled to one or more pump switch circuits to control one or more voltage pumps.

Figure 5:
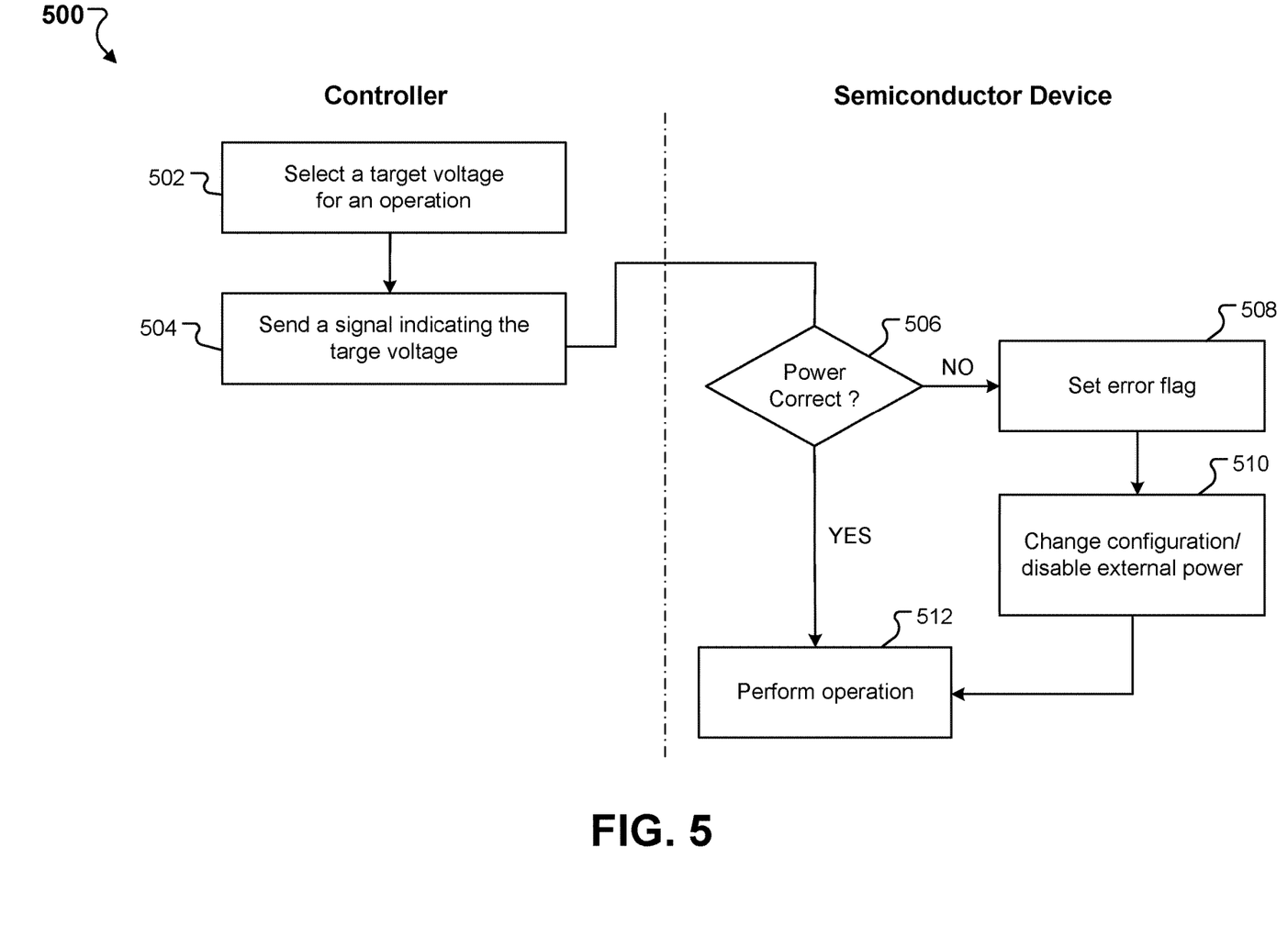
FIG. 5 is a flow chart of an example process for managing power supply between a controller and a semiconductor device.

FIG. 5 is a flow chart of an example process 500 for managing power supply between a controller and a semiconductor device. The controller can be the device controller 112 of FIG. 1 or the host controller 122 of FIG. 1. The semiconductor device can be the memory 116 of FIG. 1, the memory device 200 of FIG. 2, or the memory device 400 or the memory chip 410 of FIG. 4. The semiconductor device can include a memory array (e.g., the memory array 210 of FIG. 2). As illustrated in FIG. 5, the process 500 can include a plurality of steps that can be correspondingly performed by the controller and the semiconductor device.

The semiconductor device can include a memory array (e.g., the memory array 210 of FIG. 2) having an array of memory cells coupled to a plurality of word lines. The controller can be configured to send a command to the semiconductor device, and the command can indicate the semiconductor device to perform an operation, e.g., read, program/write, or erase operation on the memory array.

In some implementations, the semiconductor device includes a voltage generator (e.g., the HV generator 140 of FIG. 1 or the HV generator 220 of FIG. 2), a pump switch circuit (e.g., the pump switch circuit 240 of FIG. 2 or 330 of FIG. 3), and an interface (e.g., the memory interface 202 of FIG. 2). The pump switch circuit can be configured to be coupled to the voltage pump, and the interface can include an additional voltage pin (e.g., pin 202c of FIG. 2, pin 331 of FIG. 3, or pin 403a, 403b of FIG. 4) coupled to the pump switch circuit and configured to receive an input voltage (e.g., $V_{ADD}$ of FIG. 2 or FIG. 3). The voltage generator can include one or more voltage pumps (e.g., the voltage pump 222 of FIG. 2 or the voltage pump 310 of FIG. 3). A voltage pump can have an input (e.g., the input 311 of FIG. 3), an output (e.g., the output 313 of FIG. 3), and a series of pump stages (e.g., the pump stages 312 of FIG. 3) coupled between the input and the output.

In some implementations, the semiconductor device includes a voltage detector (e.g., the pin detector 250 of FIG. 2 or the pin detector 320 of FIG. 3) and a control circuit (e.g., the control logic 204 of FIG. 2 or the control circuit 340 of FIG. 3). The control circuit is coupled to the voltage detector and the pump switch circuit. The voltage detector can be configured to detect a value of the additional voltage received at the additional voltage pin. The control circuit can be configured to receive the value of the additional voltage from the voltage detector and control the pump switch circuit based on the value of the additional voltage.

In some implementations, the interface includes a second voltage pin (e.g., pin 202a of FIG. 2 or 401 of FIG. 4) coupled to the input of the voltage pump and configured to receive a second voltage (e.g., VDD or VCC/VCCQ of FIG. 2 or FIG. 4). The voltage pump can be configured to generate an output voltage at the output of the voltage pump based on the series of pump stages and the second voltage. The voltage pump can generate the output voltage based on the second voltage and the series of pump stages with a first power efficiency (e.g., 20 to 30%).

In some implementations, the interface includes a third voltage pin (e.g., pin 202b of FIG. 2 or 402 of FIG. 4) configured to receive a third voltage (e.g., VPP of FIG. 2 or FIG. 4). The semiconductor device can further include a second voltage detector (e.g., the internal detector 230 of FIG. 2) coupled to the third voltage pin and configured to detect a value of the third voltage received at the third voltage pin, e.g., as illustrated in FIG. 2.

In some implementations, the semiconductor device further includes a row decoder (e.g., the X decoder 206 of FIG. 2) and a switch circuit (e.g., the switch circuit 208 of FIG. 2) coupled to the memory array. The row decoder can be configured to select each of the plurality of word lines. The switch circuit can be configured to: generate a set of operation voltages based on a target voltage from the voltage generator and output the set of operation voltages to the row decoder, and the row decoder can be configured to apply the set of operation voltages respectively to corresponding word lines of the plurality of word lines. The semiconductor device can be configured to perform the operation based on the set of operation voltages to the corresponding word lines.

With reference to the process 500, at step 502, the controller selects a target voltage for performing the operation. In some implementations, after the semiconductor device is fabricated, suitable operations voltages (or target voltages) can be determined for different operations with respect to minimum power consumption. For example, for a read operation, 6 V can be selected as a target voltage; for a write operation, 8 V can be selected a target voltage.

At step 504, the controller sends a signal indicating the target voltage to the semiconductor device. After receiving the signal indicating the target voltage, at step 506, the semiconductor device determines whether power is correct, e.g., by determining whether a present voltage to the semiconductor device (e.g., the third voltage VPP received at the third voltage pin) matches a predetermined voltage. The predetermined voltage can be determined based on the target voltage. For example, the predetermined voltage can be a voltage provided to a corresponding voltage pump 222 to generate the target voltage as an output of the voltage pump 222. The second voltage detector (e.g., the internal detector 230 of FIG. 2) can be used to detect a value (or voltage level) of the present voltage.

If the semiconductor device determines that the present voltage matches the predetermined voltage, the semiconductor device performs the operation using the present voltage at step 512. If the semiconductor device determines that the present voltage fails to match the predetermined voltage, the semiconductor device sets an error flag 508. The controller can detect the error flag 508 and take a corresponding action. For example, the controller can send a control signal to a voltage converter (e.g., the voltage converter 130 of FIG. 1). The controller can send the control signal in response to detecting the error flag 508 or after selecting the target voltage for the operation at step 502. The voltage converter can generate an additional voltage corresponding to the target voltage and provide the additional voltage to the additional voltage pin on the semiconductor device. The control signal can be associated with the operation and indicate a target voltage or the additional voltage.

At step 510, the semiconductor device disables external power and change a power supply configuration. The semiconductor device can disable the external power by disabling receiving the second voltage VCC/VCCQ from the second voltage pin or at the input of the voltage pump and disabling receiving the third voltage VPP from the third voltage pin. The semiconductor device can change the power supply configuration by receiving an additional voltage from the additional voltage pin and control the pump switch circuit to be coupled to a corresponding node in the voltage pump to select a corresponding number of pump stages of the series of pump stages to output the target voltage at the output of the voltage pump. After the target voltage is generated, the semiconductor device performs the operation using the target voltage at step 512. For example, the switch circuit can generate a set of operation voltages based on the target voltage from the voltage pump and output the set of operation voltages to the row decoder. The row decoder can apply the set of operation voltages respectively to corresponding word lines of the plurality of word lines. The semiconductor device can perform the operation based on the set of operation voltages to the corresponding word lines.

In some implementations, the control circuit is configured to receive a signal from the controller, the signal being associated with the operation and indicating the target voltage, receive the value of the additional voltage detected from the voltage detector, and control the pump switch circuit to be coupled to the corresponding node in the voltage pump based on the value of the additional voltage and the signal.

In some implementations, the pump switch circuit includes a switch (e.g., the switch 336 of FIG. 3) switchable to be coupled to each of a plurality of nodes (e.g., the nodes 315 of FIG. 3) in the voltage pump. The plurality of nodes can include: a first node (e.g., node 315-0 of FIG. 3) between the output of the voltage pump and a first pump stage of the series of pump stages, the first pump stage being adjacent to the output of the voltage pump, and a second node (e.g., node 315-1, 315-2, or 315-m) between two adjacent voltage pumps of the series of pump stages.

In some implementations, the control circuit is configured to: receive a second signal from the controller, the second signal being associated with a second operation and indicating a second target voltage, and control the pump switch circuit to be coupled to a second corresponding node in the voltage pump based on the second signal and a second input voltage received at the voltage pin.

In some implementations, the voltage generator further includes a reference voltage circuit (e.g., the reference voltage circuit 224 of FIG. 2) configured to provide a reference voltage, and the control circuit is coupled to the voltage generator and configured to calibrate the target voltage based on the reference voltage.

In some implementations, the interface includes a plurality of additional voltage pins (e.g., 403a, 403b of FIG. 4) including the additional voltage pin. The semiconductor device can include a plurality of voltage pumps, and each of the plurality of additional voltage pins is coupled to a corresponding voltage pump of the plurality of voltage pumps.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A semiconductor device, comprising:
a voltage pump having an input, an output, and a series of pump stages coupled between the input and the output;
a pump switch circuit configured to be coupled to the voltage pump;
an interface comprising a voltage pin coupled to the pump switch circuit; and
a control circuit coupled to the pump switch circuit,
wherein the control circuit is configured to:
determine to use an input voltage received at the voltage pin to provide a voltage corresponding to the input voltage on a corresponding node at an output of a corresponding pump stage of the series of pump stages of the voltage pump, and
control the pump switch circuit to be coupled to the corresponding node within at the output of the corresponding pump stage of the series of pump stages of the voltage pump to select a corresponding number of pump stages of the series of pump stages of the voltage pump, wherein the corresponding number is an integer identical to or greater than 0, and
wherein the pump switch circuit is configured to receive the input voltage from the voltage pin and output the voltage corresponding to the input voltage to the corresponding node at the output of the corresponding pump stage of the series of pump stages of the voltage pump such that a target voltage at the output of the voltage pump is generated based on the voltage corresponding to the input voltage and the selected corresponding number of pump stages of the series of pump stages.

2. The semiconductor device of claim 1, further comprising:
a voltage detector; and
a control circuit coupled to the voltage detector and the pump switch circuit,
wherein the voltage detector is configured to detect a value of the input voltage received at the voltage pin, and
wherein the control circuit is configured to:
receive the value of the input voltage from the voltage detector, and
control the pump switch circuit to be coupled to the corresponding node in the voltage pump based on the value of the input voltage.

3. The semiconductor device of claim 2, wherein the control circuit is configured to:
receive a signal indicating the target voltage, and
control the pump switch circuit to be coupled to the corresponding node in the voltage pump based on the signal, together with the value of the input voltage.

4. The semiconductor device of claim 3, wherein the target voltage is a first target voltage, and wherein the control circuit is configured to:
receive a second signal indicating a second target voltage, and
control the pump switch circuit to be coupled to a second corresponding node in the voltage pump based on the second signal and a second input voltage received at the voltage pin.

5. The semiconductor device of claim 2, wherein the pump switch circuit comprises a switch switchable to be coupled to each of a plurality of nodes in the voltage pump, and
wherein the plurality of nodes comprises:
a first node between the output of the voltage pump and a first pump stage of the series of pump stages, the first pump stage being adjacent to the output of the voltage pump, and
a second node between two adjacent pump stages of the series of pump stages.

6. The semiconductor device of claim 2, wherein the interface further comprises:
a second voltage pin coupled to the input of the voltage pump and configured to receive a second voltage,
wherein the voltage pump is configured to generate an output voltage at the output of the voltage pump based on the series of pump stages and the second voltage.

7. The semiconductor device of claim 2, wherein the interface further comprises a third voltage pin configured to receive a third voltage,
wherein the semiconductor device further comprises a second voltage detector coupled to the voltage pin and configured to detect a value of the third voltage received at the third voltage pin, and
wherein the control circuit is configured to:
receive the value of the third voltage from the second voltage detector,
determine whether the value of the third voltage matches a predetermined voltage, and
in response to determining that the value of the third voltage fails to match the predetermined voltage, disable receiving the third voltage at the third voltage pin and control the pump switch circuit to be coupled to the corresponding node in the voltage pump based on the value of the input voltage to generate the target voltage.

8. The semiconductor device of claim 1, further comprising:
a memory array having an array of memory cells coupled to a plurality of word lines;
a decoder coupled to the memory array and configured to select each of the plurality of word lines; and
a switch circuit coupled between the decoder and the voltage pump and configured to:
generate a set of operation voltages based on the target voltage, and
output the set of operation voltages to the decoder, and
wherein the decoder is configured to apply the set of operation voltages respectively to corresponding word lines of the plurality of word lines.

9. The semiconductor device of claim 1, wherein the input voltage is in a range of 6 V to 10 V.

10. The semiconductor device of claim 1, wherein the control circuit is configured to:
in response to determining to use the input voltage received at the voltage pin, disable an additional voltage pin coupled to the input of the voltage pump.

11. A system, comprising:
a memory device comprising a memory array having an array of memory cells coupled to a plurality of word lines; and
a controller coupled to the memory device and configured to send a command to the memory device, the command indicating the memory device to perform an operation,
wherein the memory device further comprises:
a voltage generator comprising a voltage pump having an input, an output, and a series of pump stages coupled between the input and the output;
a pump switch circuit configured to be coupled to the voltage pump;
an interface comprising a voltage pin coupled to the pump switch circuit and configured to receive an input voltage;
a control circuit coupled to the pump switch circuit,
wherein the control circuit is configured to:
determine to use an input voltage received at the voltage pin to provide a voltage corresponding to the input voltage on a corresponding node at an output of a corresponding pump stage of the series of pump stages of the voltage pump, and
control the pump switch circuit to be coupled to the corresponding node at the output of the corresponding pump stage of the series of pump stages of the voltage pump to select a corresponding number of pump stages of the series of pump stages of the voltage pump, wherein the corresponding number is an integer identical to or greater than 0, and
wherein the pump switch circuit is configured to receive the input voltage from the voltage pin and output the voltage corresponding to the input voltage to the corresponding node at the output of the corresponding pump stage of the series of pump stages of the voltage pump such that a target voltage at the output of the voltage pump is generated based on the voltage corresponding to the input voltage and the selected corresponding number of pump stages of the series of pump stages, and
wherein the memory device is configured to perform the operation based on the target voltage outputted at the output of the voltage pump.

12. The system of claim 11, comprising a voltage converter coupled to the memory device,
wherein the voltage converter is configured to generate the input voltage based on a reference voltage and provide the input voltage to the voltage pin.

13. The system of claim 12, wherein the voltage converter is coupled to the controller and configured to generate the input voltage based on a signal from the controller, the signal being associated with the command and indicating the input voltage.

14. The system of claim 11, wherein the memory device further comprises:
a voltage detector; and
a control circuit coupled to the voltage detector and the pump switch circuit,
wherein the voltage detector is configured to detect a value of the input voltage received at the voltage pin,
wherein the control circuit is configured to:
receive a signal from the controller, the signal being associated with the operation and indicating the target voltage,
receive the value of the input voltage from the voltage detector, and
control the pump switch circuit to be coupled to the corresponding node in the voltage pump based on the value of the input voltage and the signal.

15. The system of claim 14, wherein the target voltage is a first target voltage, and wherein the control circuit is configured to:
receive a second signal from the controller, the second signal being associated with a second operation and indicating a second target voltage, and
control the pump switch circuit to be coupled to a second corresponding node in the voltage pump based on the second signal and a second input voltage received at the voltage pin.

16. The system of claim 15, wherein the controller is configured to send a control signal to a voltage converter to generate the second input voltage to be provided to the voltage pin.

17. The system of claim 14, wherein the pump switch circuit comprises a switch switchable to be coupled to each of a plurality of nodes in the voltage pump, and
wherein the plurality of nodes comprises:
a first node between the output of the voltage pump and a first pump stage of the series of pump stages, the first pump stage being adjacent to the output of the voltage pump, and
a second node between two adjacent voltage pumps of the series of pump stages.

18. The system of claim 14, wherein the interface further comprises:
a second voltage pin coupled to the input of the voltage pump and configured to receive a second voltage,
wherein the voltage pump is configured to generate an output voltage at the output of the voltage pump based on the series of pump stages and the second voltage.

19. The system of claim 14, wherein the interface further comprises a third voltage pin configured to receive a third voltage,
wherein the memory device further comprises a second voltage detector coupled to the voltage pin and configured to detect a value of the third voltage received at the third voltage pin, and
wherein the control circuit is configured to:
receive the value of the third voltage from the second voltage detector,
determine whether the value of the third voltage matches a predetermined voltage associated with the target voltage, and
in response to determining that the value of the third voltage fails to match the predetermined voltage, disable receiving the third voltage at the third voltage pin and control the pump switch circuit to be coupled to the corresponding node in the voltage pump based on the value of the input voltage to generate the target voltage.

20. The system of claim 11, wherein the interface comprises a plurality of additional voltage pins including the voltage pin, and
wherein the memory device comprises a plurality of voltage pumps, and wherein each of the plurality of additional voltage pins is coupled to a corresponding voltage pump of the plurality of voltage pumps.

21. The system of claim 11, further comprising:
a row decoder coupled to the memory array and configured to select each of the plurality of word lines; and
a switch circuit coupled between the row decoder and the voltage generator, wherein the switch circuit is configured to:
generate a set of operation voltages based on the target voltage, and
output the set of operation voltages to the row decoder, and
wherein the row decoder is configured to apply the set of operation voltages respectively to corresponding word lines of the plurality of word lines, and
wherein the memory device is configured to perform the operation based on the set of operation voltages to the corresponding word lines.

22. A method performed by a semiconductor device, the method comprising:
receiving a command to perform an operation in the semiconductor device;
receiving a signal indicating a target voltage associated with the operation;
detecting a value of an input voltage at a voltage pin of the semiconductor device, wherein the semiconductor device comprises a pump switch circuit coupled to the voltage pin;
determining to use the input voltage received at the voltage pin to provide a voltage corresponding to the input voltage on a corresponding node at an output of a corresponding pump stage of a series of pump stages of a voltage pump;
controlling the pump switch circuit to be coupled to the corresponding node at the output of the corresponding pump stage of the series of pump stages of the voltage pump of the semiconductor device based on the voltage corresponding to the input voltage and the signal indicating the target voltage to select a corresponding number of pump stages, wherein the voltage pump comprises an input, an output, and the series of pump stages coupled between the input and the output, wherein the corresponding number is an integer identical to or greater than 0;
generating the target voltage at the output of the voltage pump using the corresponding number of pump stages coupled between the corresponding node and the output of the voltage pump; and
performing the operation based on the target voltage.

23. The method of claim 22, further comprising:
receiving a second input voltage from a second voltage pin;
determining whether the second input voltage matches a predetermined voltage that is associated with the target voltage; and
in response to determining that the second input voltage fails to match the predetermined voltage, disabling receiving the second input voltage to the semiconductor device,
wherein controlling the pump switch circuit to be coupled to the corresponding node in the voltage pump is in response to determining that the second input voltage fails to match the predetermined voltage.

* * * * *